(12) United States Patent
Yoon

(10) Patent No.: US 8,626,247 B2
(45) Date of Patent: *Jan. 7, 2014

(54) MOBILE TERMINAL HAVING DUAL DISPLAY UNIT AND METHOD OF CHANGING DISPLAY SCREEN USING THE SAME

(75) Inventor: Sang Hyeon Yoon, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/364,830

(22) Filed: Feb. 2, 2012

(65) Prior Publication Data

US 2012/0133573 A1 May 31, 2012

Related U.S. Application Data

(63) Continuation of application No. 11/936,536, filed on Nov. 7, 2007, now Pat. No. 8,135,441.

(30) Foreign Application Priority Data

Nov. 23, 2006 (KR) ........................ 10-2006-0116224

(51) Int. Cl.
*H04M 1/00* (2006.01)
*H04B 1/38* (2006.01)

(52) U.S. Cl.
USPC ......... 455/566; 455/3.05; 455/3.06; 455/574; 455/90.2; 455/90.3; 345/212; 345/213; 345/214; 348/14.03; 348/14.07; 348/14.11; 348/14.16

(58) Field of Classification Search
USPC ......... 455/3.05–3.06, 566, 574, 575.3–575.4, 455/90.1–90.3; 345/1.1, 2.3, 211–215; 348/14.01–14.07, 14.11, 14.16
See application file for complete search history.

(56) References Cited

U.S. PATENT DOCUMENTS

| | | | |
|---|---|---|---|
| 7,173,665 B2 * | 2/2007 | Kawasaki et al. | 348/376 |
| 7,450,977 B2 * | 11/2008 | Oe et al. | 455/575.3 |
| 7,747,970 B2 * | 6/2010 | Sanchez et al. | 715/864 |
| 7,844,301 B2 * | 11/2010 | Lee et al. | 455/566 |
| 7,870,615 B2 * | 1/2011 | Machida et al. | 726/29 |
| 2004/0266475 A1 * | 12/2004 | Mirza et al. | 455/550.1 |
| 2007/0123205 A1 * | 5/2007 | Lee et al. | 455/403 |

FOREIGN PATENT DOCUMENTS

| | | | | |
|---|---|---|---|---|
| EP | 1 361 500 | | 2/2002 | |
| EP | 1 564 968 | | 11/2003 | |
| EP | 1 596 562 | * | 11/2005 | ............ H04M 1/725 |
| KR | 1020060109759 | | 10/2006 | |

* cited by examiner

*Primary Examiner* — Tuan A Tran
(74) *Attorney, Agent, or Firm* — The Farrell Law Firm, P.C.

(57) ABSTRACT

A mobile terminal having a dual display unit and a method of changing a display screen using the same are disclosed. The mobile terminal includes a main body, a front display unit for providing a multimedia mode, a rear display unit for providing a normal mode, and a screen control module for controlling to turn off the rear display unit and turn on the front display unit, and to display a multimedia execution screen in the front display unit. The method of changing a display screen of the mobile terminal having additional multimedia functions provides an optimum multimedia environment and improves user convenience and effectiveness of the mobile terminal by flexibly supporting a multimedia function to be executed according to a screen state of the rear display unit.

4 Claims, 15 Drawing Sheets

MOBILE TERMINAL HAVING DUAL DISPLAY UNIT AND METHOD OF CHANGING DISPLAY SCREEN USING THE SAME

PRIORITY

This application is a continuation application of U.S. patent application Ser. No. 11/936,536, filed Nov. 7, 2007 and claims priority to an application filed in the Korean Intellectual Property Office on Nov. 23, 2006 and assigned Ser. No. 10-2006-0116224, the contents of which are incorporated herein by reference.

BACKGROUND OF THE INVENTION

1. Field of the Invention

The present invention relates to a mobile terminal, and more particularly, to a mobile terminal having a dual display unit for providing a normal mode and a multimedia mode, and a method of changing a display screen using the same.

2. Description of the Prior Art

With the remarkable development in information and telecommunication technology and semiconductor technology, popularization of various mobile terminals is increasing rapidly. Mobile terminals are developing to a level of convergence at which each mobile terminal is able to challenge markets of other mobile terminals by expanding outside its original market. In particular, a mobile phone provides various multimedia functions such as watching TV (for example, Digital Multimedia Broadcasting Digital (DMB) and Digital Video Broadcasting (DVB)), playing music (for example, MPEG_1 Audio Layer 3 (MP3)), and photographing, in addition to its basic functions of voice communication and message transmission.

A display unit of the mobile terminal outputs information stored in the mobile terminal, information received from an external source, and user input information by using a visual means. The display unit is a portion of the mobile terminal used by a user most frequently, and thereby greatly affects the degree of user satisfaction with the mobile terminal. The importance of the display unit becomes even greater as more multimedia functions are added to the mobile terminal. Most of all, the size and quality of the display unit must be excellent to provide a better multimedia environment with the display unit. However, the mobile terminal has various limitations such as a limited size and dimensions.

SUMMARY OF THE INVENTION

The present invention has been made in view of the above problems, and provides a mobile terminal having a front display unit for providing a multimedia mode and a rear display unit for providing a normal mode that are formed at a front and rear surface, respectively, of a main body of the mobile terminal, and a method of changing a display screen in the mobile terminal having additional multimedia functions, that provide an optimum multimedia environment and improve usability and competitiveness of the mobile terminal due to the additional multimedia functions.

According to an exemplary embodiment of the present invention, a mobile terminal having a dual display unit includes a main body, front display unit, rear display unit, and screen control module. The main body is formed in two rotatable portions assembled together. The front display unit for providing a multimedia mode has a screen formed at a front surface of the main body. The rear display unit for providing a normal mode has a screen smaller than the screen of the front display unit and is formed at the rear surface of the main body. The screen control module controls whether execution of a multimedia function is requested while the rear display unit is turned on, turning off the rear display unit and turning on the front display unit, and displaying an execution screen of a multimedia function in the front display unit.

The mobile terminal may further include a front input unit, rear input unit, and side input unit formed at the front surface, the rear surface, and side surfaces, respectively, of the main body. The front input unit may be formed with a touchpad and the rear input unit may be formed with a keypad. The side input unit may include a screen change button and a shortcut button. The front display unit and the rear display unit may be formed with a Quarter Video Graphics Array (QVGA) Liquid Crystal Display (LCD) and a Quarter Common Intermediate Format (QCIF) LCD respectively.

The multimedia function is preferably at least one of the functions of watching TV, playing music, photographing, viewing a photograph, playing a moving picture, reading an electronic book, activating a virtual animal pet, and executing a browser of a service provider. Additionally, the multimedia function may support only the multimedia mode or may support both the multimedia and normal modes.

According to another exemplary embodiment of the present invention, a method of changing a display screen in a mobile terminal having a front display unit for providing a multimedia mode and a rear display unit for providing a normal mode includes receiving an input signal for executing a multimedia function while the rear display unit is turned on; turning off the rear display unit and turning on the front display unit; and displaying an execution screen of the multimedia function in the front display unit.

According to another exemplary embodiment of the present invention, a method of changing a display screen in a mobile terminal having a front display unit that has a screen for providing a multimedia mode and a rear display unit that has a screen smaller than the screen of the front display unit for providing a normal mode, includes selecting a multimedia function from a menu screen of the rear display unit; turning off the rear display unit and turning on the front display unit if the selected multimedia function is not supported by the normal mode; and displaying an execution screen of the selected multimedia function in the front display unit.

The method may further include displaying, an execution screen of the selected multimedia function in the rear display unit if the selected multimedia function is supported by the normal mode; identifying whether a screen change button is input; turning off the rear display unit and turning on the front display unit if a screen change button is input; and displaying the execution screen of the selected multimedia function in the front display unit.

The method may further include displaying, before turning off the rear display unit and turning on the front display unit, a pop-up window notifying a screen change in the rear display unit; wherein turning off the rear display unit and turning on the front display unit is executed when a time duration has elapsed after displaying the pop-up window notifying a screen change.

The method may further include identifying, after displaying the execution screen of the selected multimedia function in the front display unit, whether a screen change button is input; displaying, if a screen change button is input, a pop-up window notifying a screen change in the front display unit; and turning off the front display unit and turning on the rear display unit when a time duration has elapsed after displaying the pop-up window notifying a screen change.

According to another exemplary embodiment of the present invention, a method of changing a display screen in a mobile terminal having a front display unit that has a screen for providing a multimedia mode and a rear display unit that has a screen smaller than the screen of the of the front display unit for providing a normal mode, includes identifying, if a shortcut button for executing a multimedia function is input while a waiting screen is displayed in the rear display unit, whether the multimedia function to be executed is supported by the normal mode; turning off the rear display unit and turning on the front display unit, if the multimedia function to be executed is not supported by the normal mode; and displaying an execution screen of the multimedia function in the front display unit.

According to a further exemplary embodiment of the present invention, a method of changing a display screen in a mobile terminal having a front display unit that has a screen for providing a multimedia mode and a rear display unit that has a screen smaller than the screen of the front display unit for providing a normal mode includes identifying whether a screen change button is input while a waiting screen is displayed in the rear display unit; turning off the rear display unit and turning on the front display unit if a screen change button is input; displaying a menu screen of the most recently executed multimedia function in the front display unit; and displaying an execution screen of the selected multimedia function in the front display unit, if a multimedia function is selected from the menu screen.

BRIEF DESCRIPTION OF THE DRAWINGS

The objects, features and advantages of the present invention will become more apparent from the following detailed description in conjunction with the accompanying drawings, in which.

DETAILED DESCRIPTION OF PREFERRED EMBODIMENTS

Hereinafter, preferred embodiments of the present invention are described in detail with reference to the accompanying drawings. The same reference numbers are used throughout the drawings. Detailed descriptions of constructions or processes known in the art may be omitted to avoid obscuring the subject matters of the present invention.

Figure 1A:
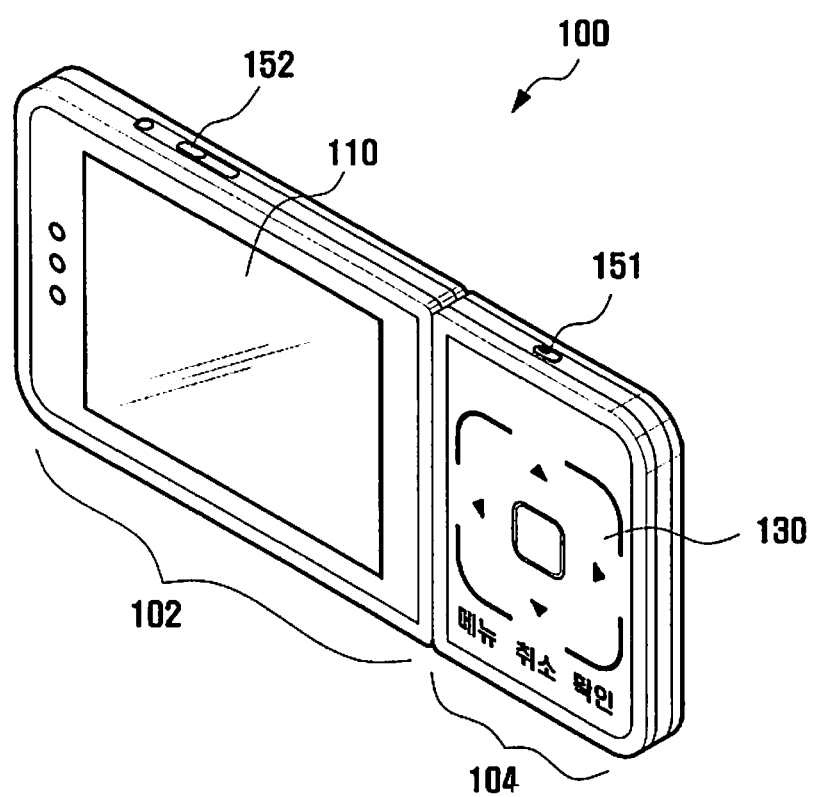
FIGS. 1A and 1B are views showing a front surface and a rear surface respectively of a mobile terminal having a dual display unit according to an exemplary embodiment of the present invention.
Figure 1B:
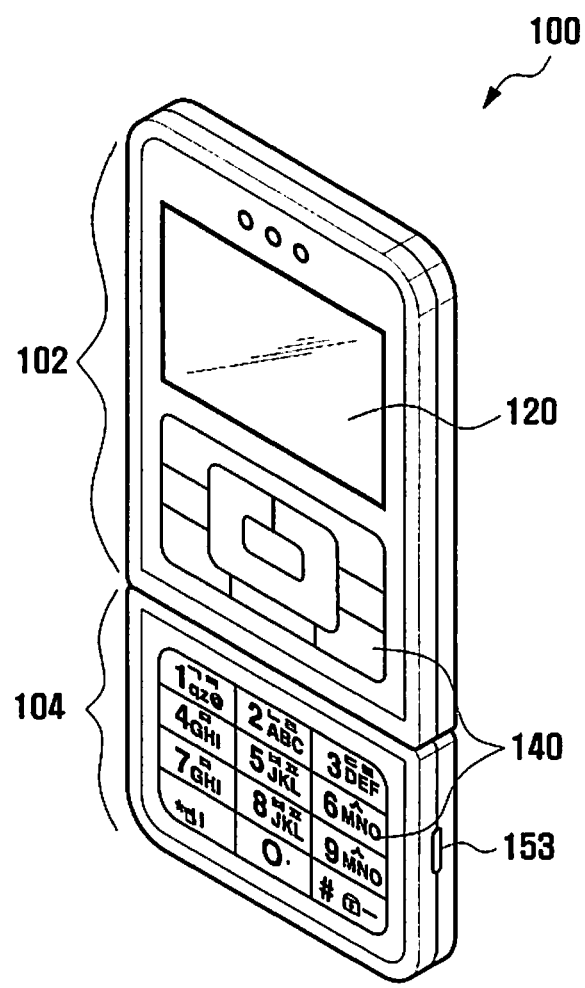

Referring to FIGS. 1A and 1B, the mobile terminal 100 includes a front display unit 110 and a rear display unit 120 installed at its front and rear surfaces, respectively. LCDs are generally used for the display units 110 and 120. However, other display devices, such as an Active Matrix Organic Light Emitting Diode (AM OLED) display device, may also be used for the display units 110 and 120. The front display unit 110 has a larger screen size and a higher resolution than the rear display unit 120. For example, the front display unit 110 may be formed with a large QVGA LCD and the rear display unit 120 may be formed with a small QCIF LCD. The front surface and the rear surface of the mobile terminal 100 are distinguished for convenience in describing the present specification.

The front display unit 110 outputs an execution screen of a multimedia function, which is referred to as a multimedia mode in this specification. The rear display unit 120 outputs an execution screen of a general function such as a communication function, which is referred to as a normal mode in this specification. The normal mode may alternatively be referred to as a phone mode in this specification.

The multimedia function includes functions such as watching TV, playing music, photographing, viewing a photograph, playing a moving picture, reading an e-book (Electronic Book), activating a virtual animal pet, and executing a browser of a service provider. The multimedia functions may support only the multimedia function (i.e. without supporting the normal mode) or may support both the multimedia and normal modes. For example, the functions of watching TV and reading an E-Book are supported only by the multimedia mode, and the functions of playing music and photographing are supported by both the multimedia and normal modes. In this specification, 'A function supports a mode' means that an execution screen of a function can be displayed in a display unit supporting the corresponding mode.

When displaying a screen, the front display unit 110 preferably provides a horizontal display mode as shown in FIG. 1A and the rear display unit 120 preferably provides a vertical display mode as shown in FIG. 1B. However, in the case that the browser of the service provider supports only the multimedia mode, the front display unit 110 may also be able to provide a vertical display mode. The rear display 120 may also provide a horizontal display mode.

The mobile terminal 100 includes a front input unit 130 and a rear input unit 140 formed at its front and rear surfaces respectively, and further includes a side input unit 150 having a plurality of input buttons 151, 152, and 153 formed at its side surfaces. For example, the front input unit 130 is formed with a touchpad and the rear input unit 140 is formed with a keypad. The touchpad of the front input unit 130 may be configured with 12 touch buttons. The touch buttons may include 4 direction buttons, a menu button, a cancellation button, a confirmation button, and a special button for a service provider. The keypad of the rear input unit 140 may be configured with 3×4 alphanumeric keys, 4 direction search keys, and various function keys. The side input unit may include a screen change button 151, a volume control button 152, and a shortcut button 153. The screen change button 151 may also operate as a lock button corresponding to its position.

Main bodies 102 and 104 of the mobile terminal 100 are rotatably assembled with respect to each other at the connecting surface of the front display unit 110 and the front input unit 130.

As described above, the mobile terminal 100 according to an exemplary embodiment of the present invention is formed with a dual display unit including a large front display unit for providing a multimedia mode and a small rear display unit for providing a normal mode. The front and rear display units of the dual display unit cannot be turned on at the same time. That is, if one display unit is turned on, then the other display unit is turned off. All menus of functions executable by the mobile terminal 100 are displayed in a hierachical structure in the rear display unit 120, and include a list of multimedia functions. After selecting a multimedia function from a menu screen of the rear display unit 120, an execution screen of the multimedia function is preferably displayed in the front display unit 110.

Hereinafter, steps of changing a menu screen of the rear display unit 120 to a multimedia execution screen not supporting a normal mode are described referring to display screen examples of the mobile terminal 100 in FIGS. 2A to 2E.

Figure 2A:
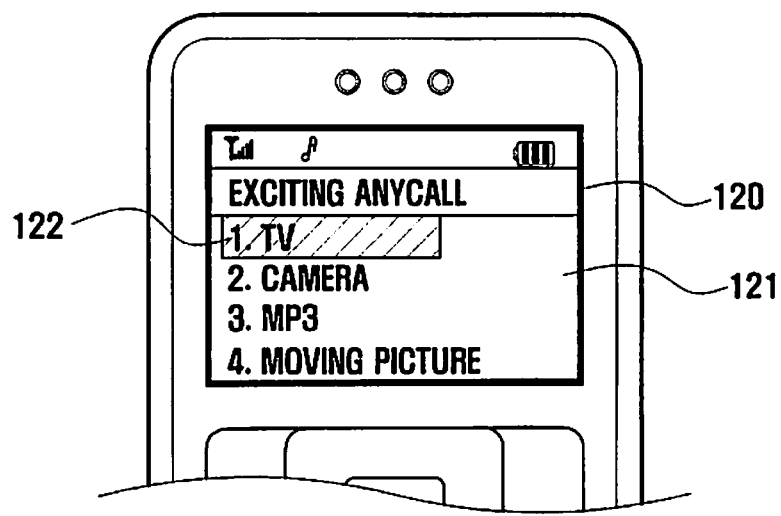
FIGS. 2A to 2E are display screen examples in the mobile terminal of FIGS. 1A and 1B.
Figure 2B:
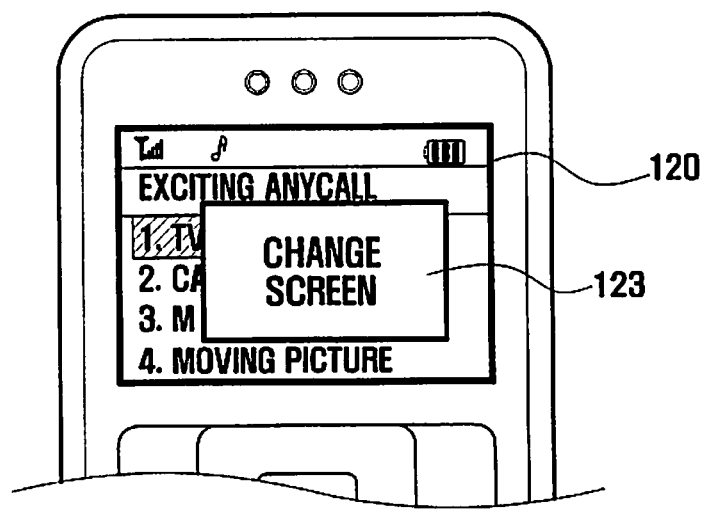

In a normal mode, a menu screen 121 is displayed in the rear display unit 120, as shown in FIG. 2A. Various menu items and a highlighting focus 122 selecting a specific menu item are displayed in the menu screen 121. If a multimedia function not supporting a normal mode (for example, watching TV) is selected by moving the focus 122, a pop-up window 123 for notifying a screen change is displayed in the rear display unit 120, as shown in FIG. 2B.

Figure 2C:
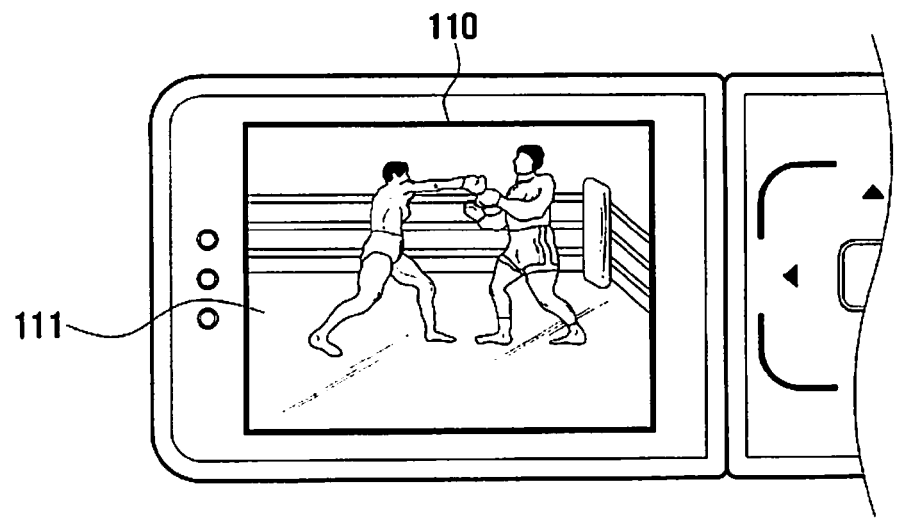

When a time duration has elapsed after displaying the pop-up window 123, a screen change is performed by automatically turning off the rear display unit 120 and turning on the front display unit 110, as shown in FIG. 2C. When the front display unit 110 is turned on, an execution screen 111 of the previously selected multimedia function is displayed in the front display unit 110. For example, in the case that a TV-watching function has been selected, a broadcasting channel watched most recently is stored in the mobile terminal 100 and is automatically connected when the front display unit 110 turns on.

Figure 2D:
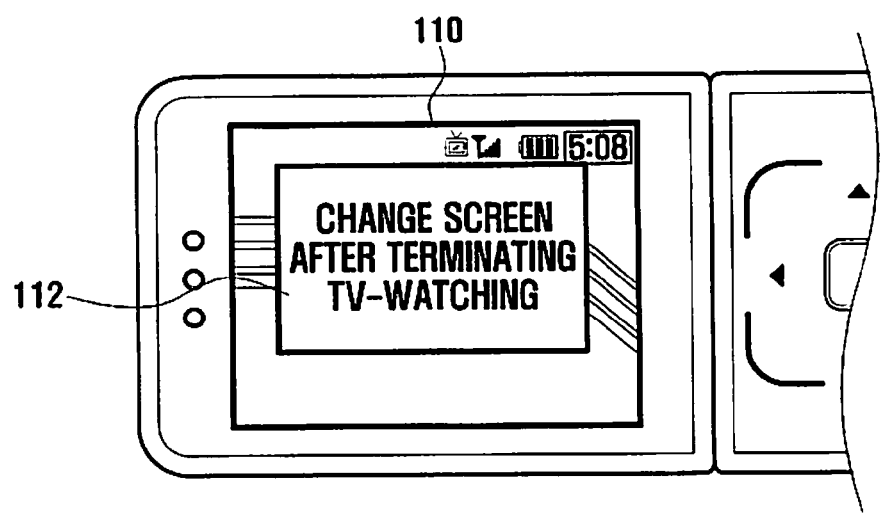
Figure 2E:
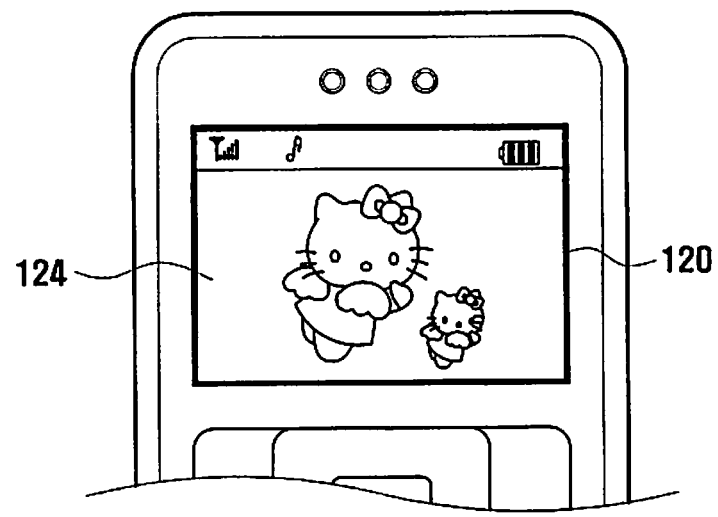

The front display unit 110 executing a multimedia function may be switched to the rear display unit 120 by pressing the screen change button 151 of FIG. 1A. If the screen change button 151 is pressed, a pop-up window 112 notifying a screen change is displayed in the front display unit 110, as shown in FIG. 2D. When a time duration has elapsed after displaying the pop-up window 112, the front display unit 110 is automatically turned off, and a waiting screen 124 is displayed in the rear display unit 120 as the rear display unit 120 is turned on, as shown in FIG. 2E.

Hereinafter, steps of changing a menu screen of the rear display unit 120 to a multimedia execution screen supported by a normal mode are described referring to display screen example of the mobile terminal 100 in FIGS. 3A to 3G.

Figure 3A:
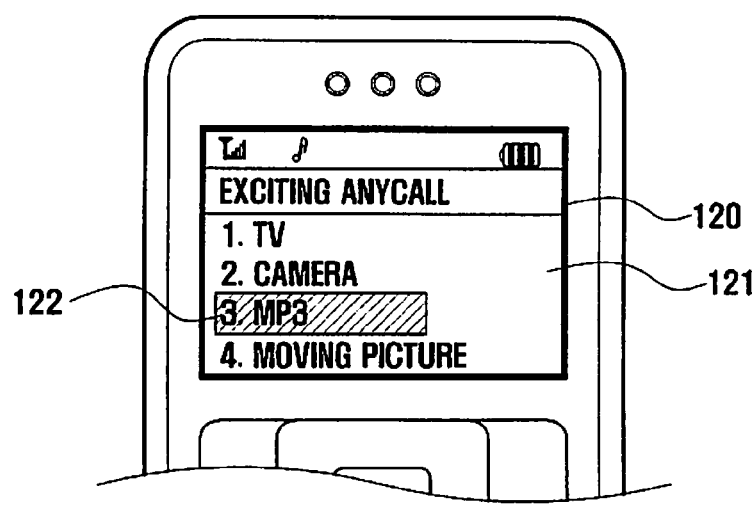
FIGS. 3A to 3G are further display screen examples in the mobile terminal of FIGS. 1A and 1B.
Figure 3B:
Figure 3C:
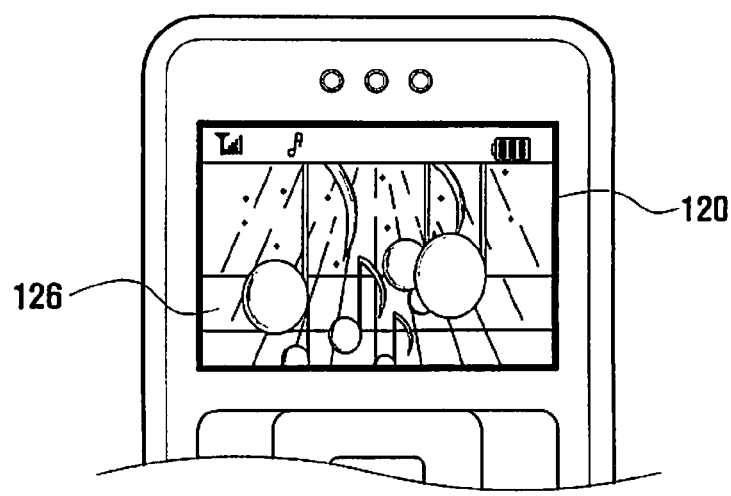

If a multimedia function supported by a normal mode (for example, MP3) is selected by moving the focus 122 displayed in the menu screen 121 of the rear display unit 120 in a normal mode, as shown in FIG. 3A, either a submenu screen 125 is displayed before displaying an execution screen 126 of the selected menu item, as shown in FIG. 3B, or, if submenu screen exists, the execution screen 126 is displayed in the rear display unit 120, as shown in FIG. 3C.

Figure 3D:
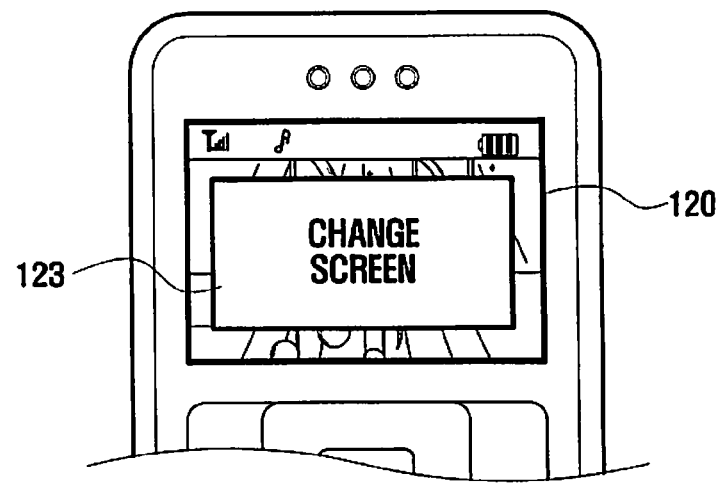
Figure 3E:
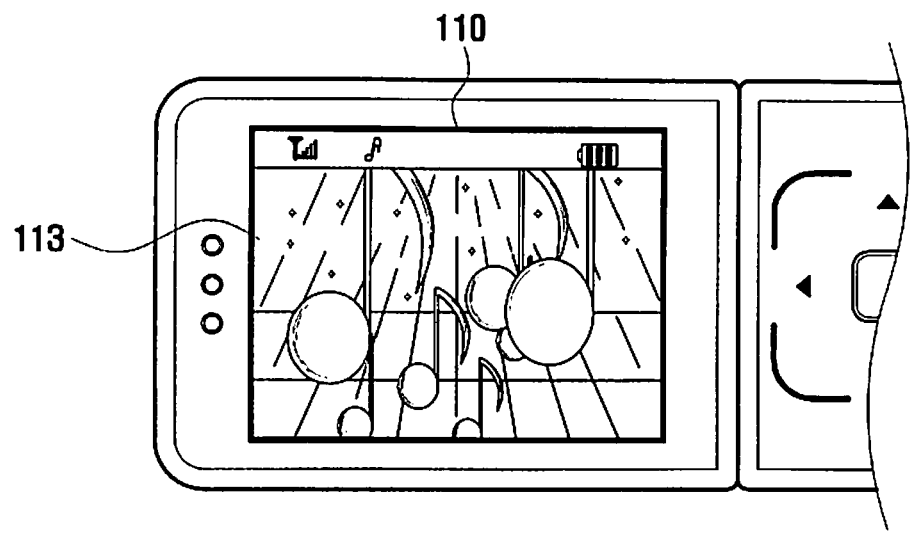

The execution screen 126 of the multimedia function displayed in the rear display unit 120 may be switched to the front display unit 110 by manually pressing the screen change button 151 of FIG. 1A. If the screen change button 151 is pressed, the pop-up window 123 notifying a screen change is displayed in the rear display unit 120, as shown in FIG. 3D. When a time duration has elapsed after displaying the pop-up window 123, the rear display unit 120 is automatically turned off, and an execution screen 113 of a multimedia function is displayed in the front display unit 110 as the front display unit 110 is turned on, as shown in FIG. 3E.

Figure 3F:
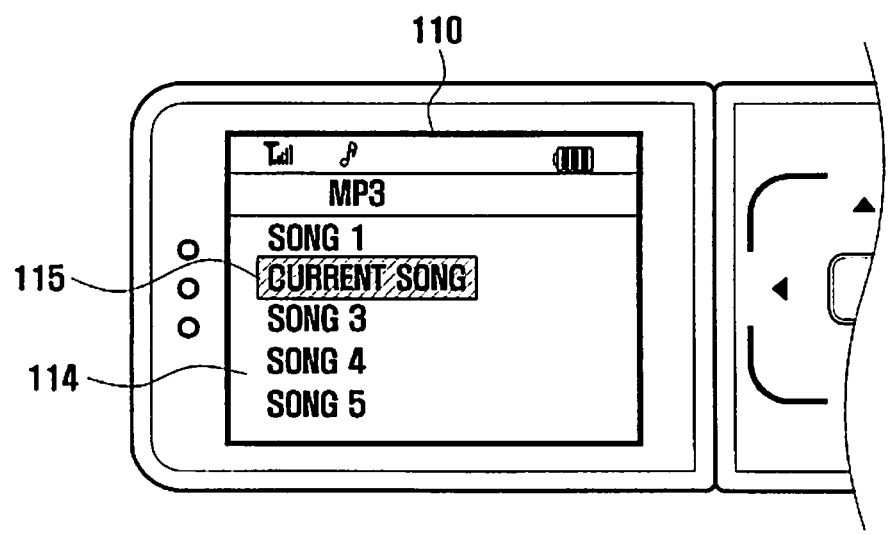
Figure 3G:
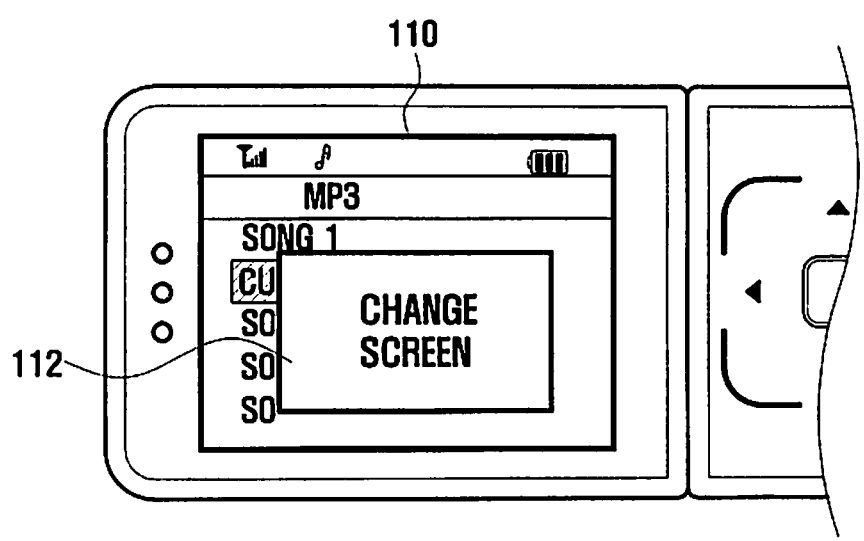

As described, the execution screen 126 of the multimedia function displayed in the rear display unit 120 may be switched to the front display unit 110 by manually pressing the screen change button 151 of FIG. 1A. If, before pressing the screen change button 151, the cancellation button of the front input unit 130 of FIG. 1A is pressed, and then the screen change button 151 is pressed, a menu screen 114 of a multimedia function (for example, a list of MP3 songs) is displayed in the front display unit 110, as shown in FIG. 3F. At this moment, the focus 115 is located at the currently executing multimedia item (i.e. song currently being played). If another multimedia item is selected by moving the focus 115 and the confirmation button is pressed, the corresponding multimedia item is executed. If the screen change button 151 is pressed again, the pop-up window 112 is displayed as shown in FIG. 3G and the display screen returns to the waiting screen 124 of FIG. 2E.

The above two examples have shown methods of changing a display screen when entering a multimedia function through the menu screen 121 of the rear display unit 120.

However, entering a multimedia function in a normal mode of the rear display unit 120 may also be performed through the waiting screen instead of the menu screen, and the corresponding steps are described hereinafter referring to display screen examples of the mobile terminal 100 in FIGS. 4A to 4D.

Figure 4A:
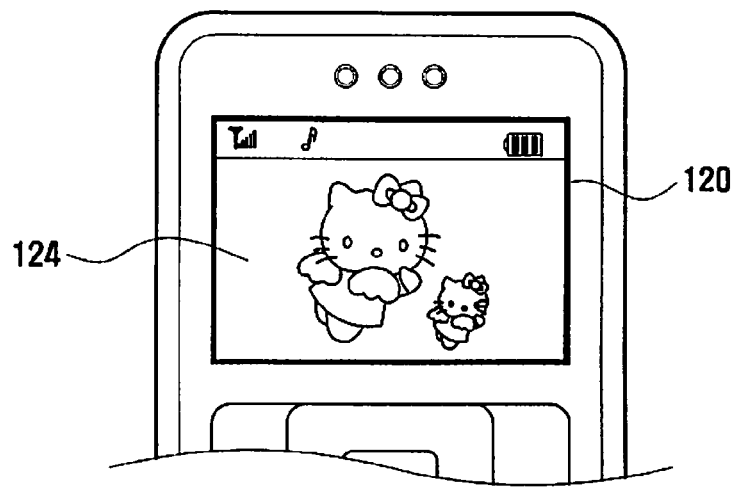
FIGS. 4A to 4D are further display screen examples in the mobile terminal of FIGS. 1A and 1B.

First, the waiting screen 124 is displayed in the rear display unit 120 in a normal mode, as shown in FIG. 4A. In the waiting screen 124 of the rear display unit 120, entering a multimedia function may be performed by pressing the shortcut key 153 of FIG. 1B or by pressing the screen change button 151 of FIG. 1A. In the case of using the shortcut button 153, the screen change may be performed in different ways corresponding to a time duration of pressing the shortcut button 153.

Figure 4B:
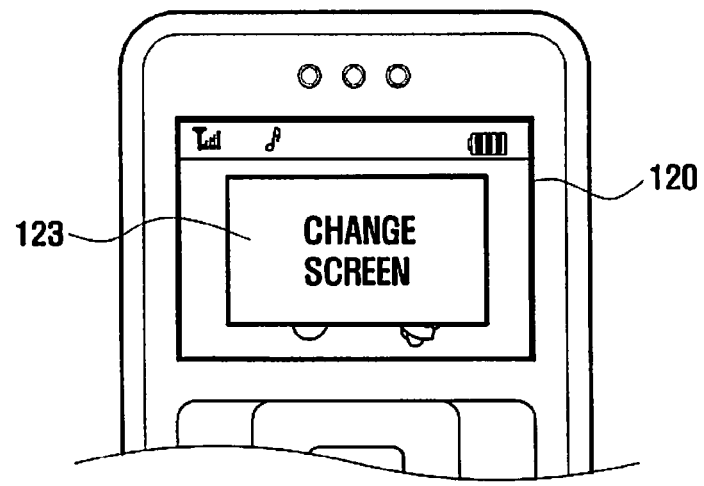
Figure 4C:
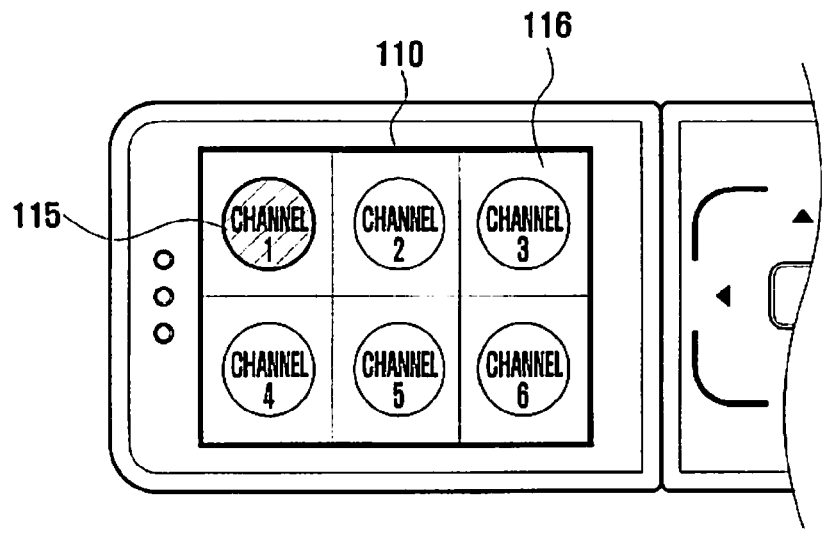

If the shortcut button 153 is pressed for an extended time duration in the waiting screen 124 of the rear display unit 120, the pop-up window 123 notifying a screen change is displayed in the rear display unit 120, as shown in FIG. 4B. When a time duration has elapsed after displaying the pop-up window 123, a screen change is performed by automatically turning off the rear display unit 120 and turning on the front display unit 110, as shown in FIG. 4C, which shows an example in which the shortcut button 153 is assigned to a TV-watching function. At this moment, a menu screen 116 of the corresponding multimedia function (for example, a list of TV channels) is displayed in the front display unit 110. If a channel is selected by moving the focus 115 displayed in the menu screen 116, the execution screen 111 of the corresponding broadcasting channel is displayed, as shown in FIG. 4D.

In an example in which an MP3 play function is assigned to the shortcut button 153, upon changing a display screen, the menu screen 114 of FIG. 3F is displayed in the front display unit 110 instead of the menu screen 116 of FIG. 4C. As described above, the menu screen in the multimedia mode may be displayed in different forms according to the type of a multimedia function to be executed. Additionally, a plurality of shortcut buttons, each having a different multimedia function, may be formed in the mobile terminal 100, or a multimedia function may be assigned to a function key of the rear input unit 140 instead of to the shortcut button 153 of the side input unit 150.

Figure 4D:
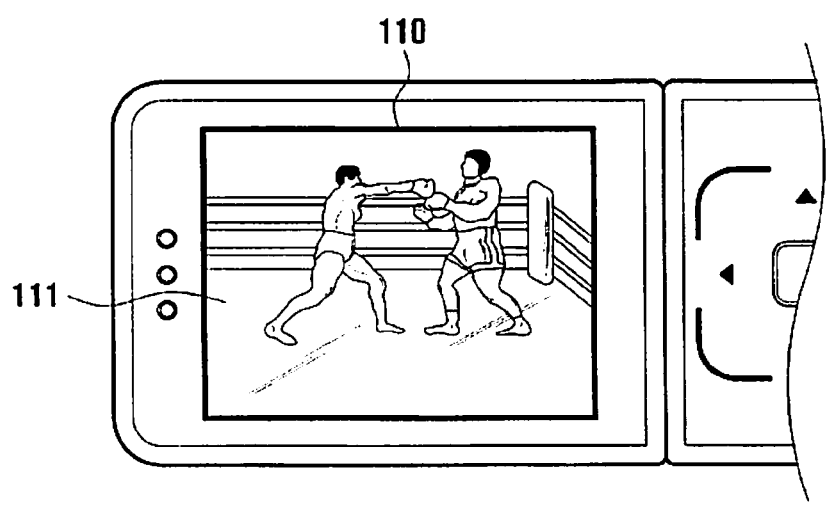

If the shortcut button 153 is pressed for a short time duration in the waiting screen 124 of FIG. 4A, the pop-up window 123 of FIG. 4B notifying a screen change is displayed and, when a time duration has elapsed, the multimedia execution screen 111 of FIG. 4D is displayed without displaying the menu screen 116 of FIG. 4C. At this moment, the execution screen 111 shows an execution screen of the most recently executed multimedia function.

If the screen change button 151 is pressed instead of the shortcut button 153 in the waiting screen 124 of FIG. 4A, the pop-up window 123 of FIG. 4B, notifying a screen change, is displayed in the same way as when the shortcut button 151 is pressed for an extended time duration, and, when a time duration has elapsed, the menu screen 116 of FIG. 4C or the menu screen 114 of FIG. 3F is displayed according to the type of the multimedia function. At this moment, the menu screen shows the most recently executed multimedia function. Subsequently, the multimedia execution screen 111 of FIG. 4D or the multimedia execution screen 113 of FIG. 3E is displayed according to the multimedia item selected from the menu screen 116 of FIG. 4C or from the menu screen 114 of FIG. 3F.

The steps of changing a display screen according to the exemplary embodiments of the present invention have been briefly described in a user position.

Figure 5:
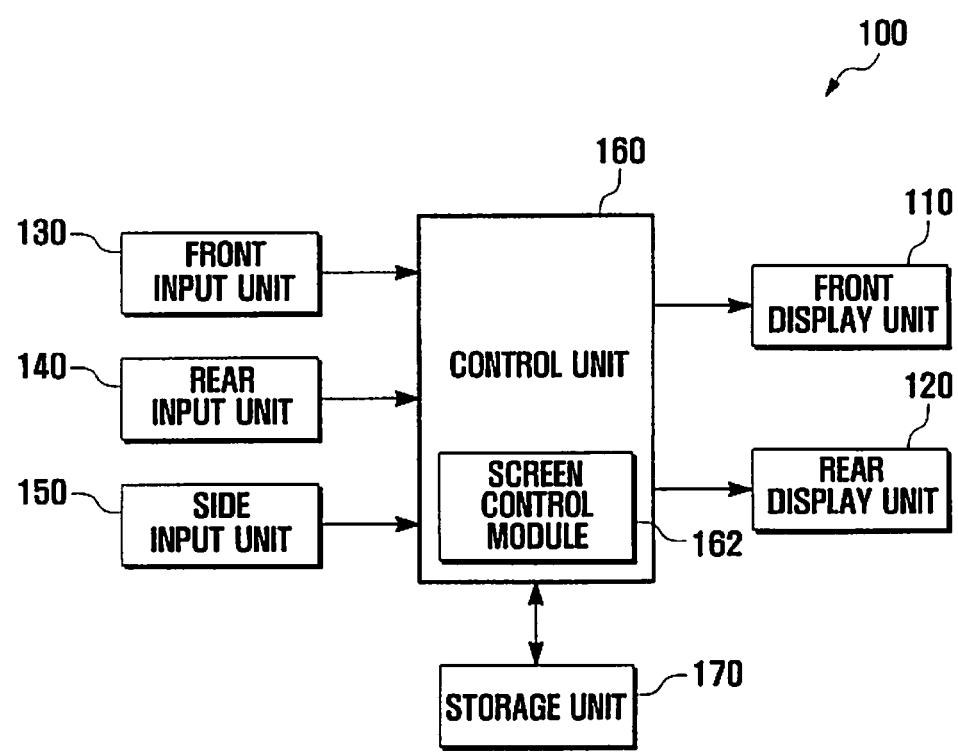
FIG. 5 is a block diagram showing a configuration of the mobile terminal of FIGS. 1A and 1B.

Referring now to FIG. 5, the mobile terminal 100 includes a front display unit 110, rear display unit 120, front input unit 130, rear input unit 140, side input unit 150, control unit 160 having a screen control module 162, and storage unit 170. The mobile terminal 100 may further include a Radio Frequency (RF) communication unit, audio processing unit, audio input/output unit, mobile broadcasting receiver for executing a multimedia function, and camera. Since, these units are conventionally used in a mobile terminal, therefore detailed descriptions are omitted.

As described above, the front display unit 110 provides a multimedia mode and the rear display unit 120 provides a normal mode. The front display unit 110 has a relatively larger screen size and a higher resolution than the rear display unit 120. For example, the front display unit 110 and the rear display unit 120 may be formed with a large QVGA LCD and a small QCIF LCD respectively.

The input units 130, 140, and 150 generate a signal according to a user operation and output the signal to the control unit 160. The front input unit 130 and the rear input unit 140 are formed with a touchpad and a keypad respectively, and the side input unit 150 is formed with a plurality of buttons. Preferably, the side input unit 150 includes the screen change button 151 (shown in FIG. 1A) and at least one shortcut button 153 (shown in FIG. 1B), and a shortcut function is assigned to a key of the rear input unit 140.

The control unit 160 controls the general operation of the mobile terminal 100 and includes one or two microprocessors. In the case that the control unit 160 includes two microprocessors, one of the microprocessors is a chip for controlling a multimedia function. In particular, the control unit 160 includes a screen control module 162. The screen control module 162 receives an input signal for executing a multimedia function from the rear input unit 140 or from the side input unit 150 in a state that the rear display unit 120 is turned on. The screen control module 162 controls the display of an execution screen of a multimedia function in the front display unit 110 by turning off the rear display unit 120 and turning on the front display unit 110. The screen control module 162 further performs various control functions related to a screen change between the front display unit 110 and the rear display unit 120. Detailed functions of the screen control module 162 are described later in relation to methods of changing a screen.

The storage unit 170 stores various programs to be executed and data processed in the mobile terminal 100, and may include at least one volatile memory and one non-volatile memory. The storage unit 170 may permanently or temporarily store an operating system of the mobile terminal 100, programs and data related to the operation of the screen control module 162, and application programs and data related to execution of a multimedia function.

Figure 6:
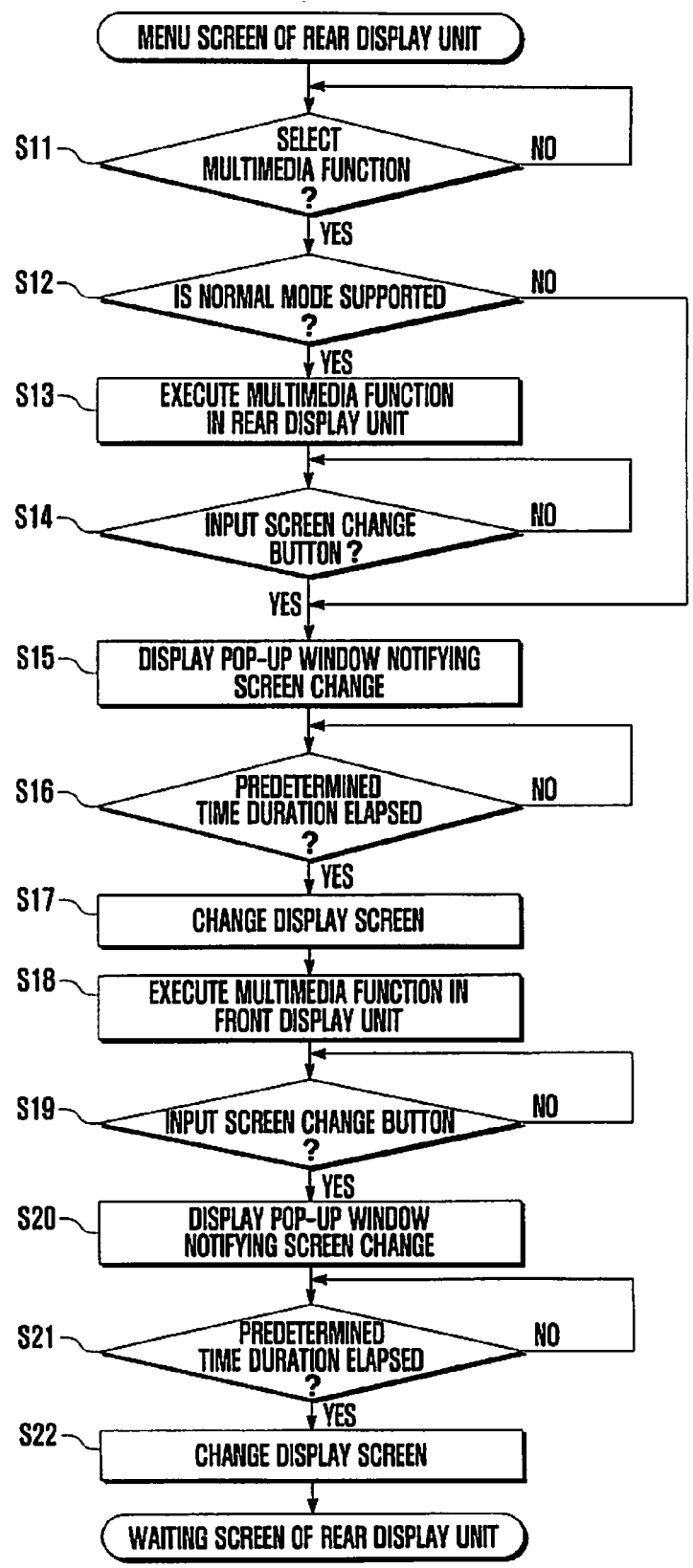
FIG. 6 is a flow chart showing a method of changing a display screen according to another exemplary embodiment of the present invention.

Referring to FIGS. 5 and 6, in a state that the rear display unit 120 of the mobile terminal 100 is turned on and a menu screen (for example, 121 of FIG. 2A) is displayed, the screen control module 162 receives an input signal from a user for selecting a multimedia function from a menu screen of the rear input unit 140 in step S11. For example, in a state that a menu screen and a focus are displayed in the rear display unit 120, the screen control module 162 receives an input signal if the user moves the focus by using 4 direction keys of the rear input unit 140 and inputs a confirmation key.

The screen control module 162 identifies whether the selected multimedia function supports a normal mode in step S12. Whether a multimedia function supports a normal mode is predetermined by settings. If the selected multimedia function is supported by a normal mode, the screen control module 162 displays an execution screen (for example, 126 of FIG. 3) of the corresponding multimedia function in the rear display unit 120 in step S13.

While executing the multimedia function, the screen control module 162 identifies whether the screen change button 151 of the side input unit 150 is pressed in step S14. If the screen change button 151 is pressed, or if the selected multimedia function does not support the normal mode in step S12, the screen control module 162 displays a pop-up window notifying a screen change (for example, 123 of FIG. 3D) in the rear display unit 120 in step S15.

When a predetermined time duration has elapsed after displaying the pop-up window notifying a screen change in step S16, the screen control module 162 changes the display screen by turning off the rear display unit 120 and turning on the front display unit 110 in step S17, and displays an execution screen of the selected multimedia function (for example, 111 of FIG. 2C or 113 of FIG. 3E) in the front display unit 110 in step S18.

While executing the multimedia function in the front display unit 110, the screen control module 162 identifies whether the screen change button 151 is pressed in step S19. If the screen change button 151 is pressed, the screen control module 162 displays a pop-up window notifying a screen change (for example, 112 of FIG. 2D) in the front display unit 110 in step S20. When a time duration has elapsed after displaying the pop-up window in step S21, the screen control module 162 changes the display screen again by turning off the front display unit 110 and turning on the rear display unit 120 in step S22. At this moment, a waiting screen (for example, 124 of FIG. 2E) is displayed in the rear display unit 120.

Figure 7:
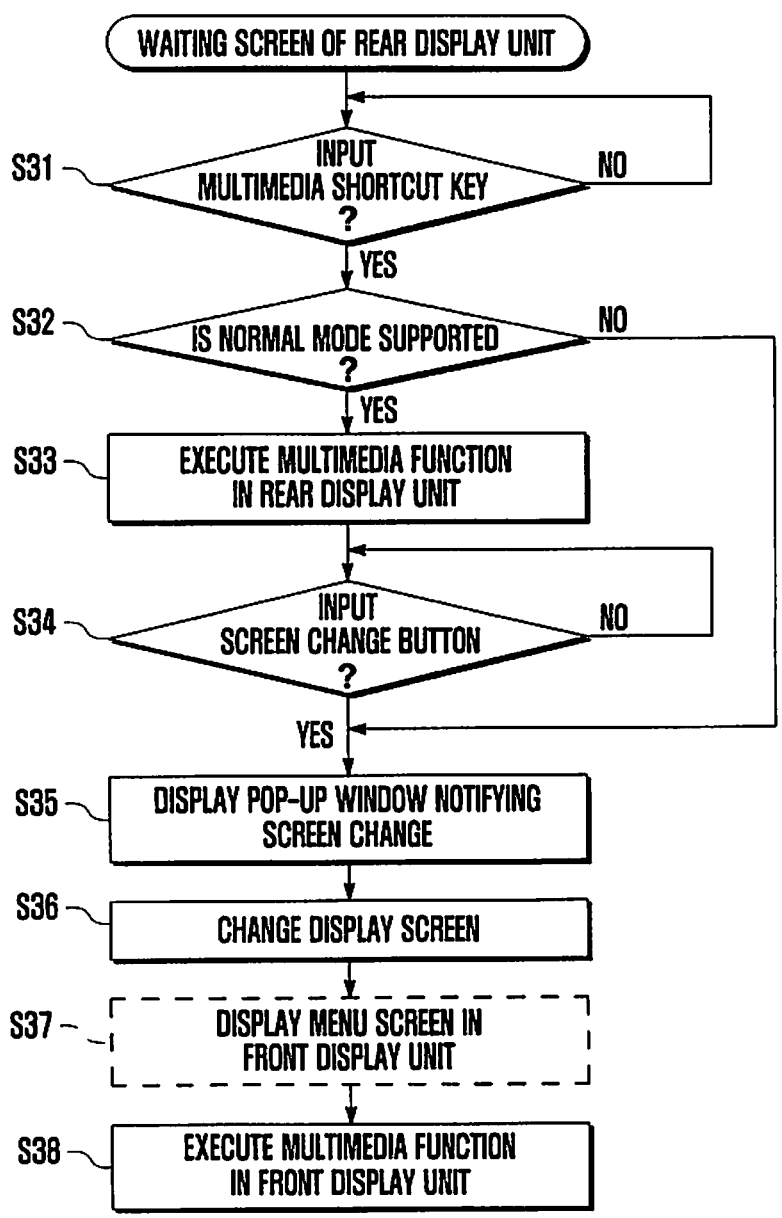
FIG. 7 is a flow chart showing another method of changing a display screen according to another exemplary embodiment of the present invention.

Referring now to FIGS. 5 and 7, in a state that the rear display unit 120 of the mobile terminal 100 is turned on and a waiting screen (for example, 124 of FIG. 4A) is displayed, the screen control module 162 determines whether a shortcut button 153 is input in step S31. The shortcut button 153 is used for entering a multimedia function in a waiting screen, and is formed in the side input unit 150. Alternatively, a shortcut function of the shortcut button 153 may be assigned to a function key of the rear input unit 140.

If the shortcut button 153 is pressed, the screen control module 162 identifies whether the multimedia function assigned to the shortcut button 153 supports a normal mode in step S32. If the input multimedia function supports a normal mode, the screen control module 162 displays an execution screen of the multimedia function in the rear display unit 120 in step S33.

While executing the multimedia function, the screen control module 162 identifies whether the screen change button 151 of the side input unit 150 is pressed in step S34. If the screen change button 151 is pressed, or if the multimedia function assigned to the shortcut button 153 does not support a normal mode in step S32, the screen control module 162 displays a pop-up window notifying a screen change in the rear display unit 120 in step S35.

When a time duration has elapsed after displaying the pop-up window notifying a screen change, the screen control module 162 changes the display screen by turning off the rear display unit 120 and turning on the front display unit 110 in step S36. Subsequently, the screen control module 162 displays an execution screen of the corresponding multimedia function in the front display unit 110 in step S38.

According to this exemplary embodiment, between steps S36 and S38, the screen control module 162 may selectively display a menu screen of multimedia functions (for example, 116 of FIG. 4C) according to a time duration time of an input by identifying whether the shortcut button 153 is pressed for an extended time duration or for a short time duration in step S37. For example, if the shortcut button 153 is pressed for a short time duration upon changing the display screen, the execution screen of the multimedia function is immediately displayed in the front display unit 110. If the shortcut button 153 is pressed for an extended time duration, upon changing the display screen, the multimedia menu screen is displayed for selection of a multimedia function. Upon selections, the execution screen of the selected multimedia function is then displayed. In another example, the shortcut button 153 may be set to perform in a converse manner; that is, if the shortcut button 153 is pressed for an extended time duration, the execution screen is immediately displayed, and if pressed for a short time duration, the multimedia menu is first displayed.

While executing the multimedia function in the front display unit 110, the screen control module 162 identifies whether the screen change button 151 is pressed. If the screen change button 151 is pressed, the screen control module 162 changes the display screen back to the rear display unit 120.

Figure 8:
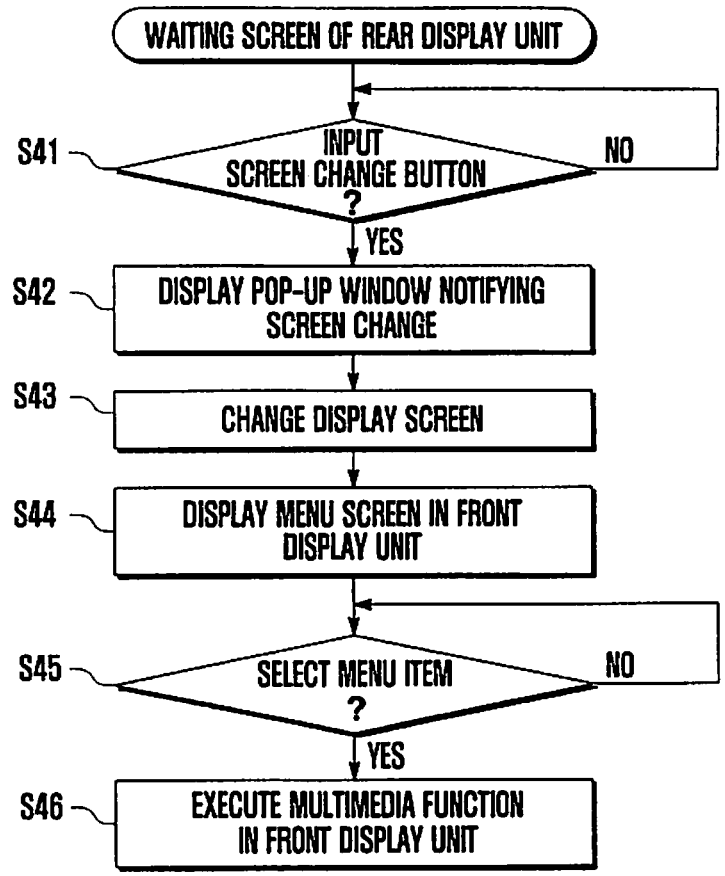
FIG. 8 is a flow chart showing another method of changing a display screen according to a further exemplary embodiment of the present invention.

Referring to FIGS. 5 and 8, in a state that the rear display unit 120 of the mobile terminal 100 is turned on and a waiting screen is displayed, the screen control module 162 identifies whether the screen change button 151 of the side input unit 150 is pressed in step S41. If the screen change button 151 is pressed, the screen control module 162 displays a pop-up window notifying a screen change in the rear display unit 120 in step S42.

When a time duration has elapsed after displaying the pop-up window notifying a screen change, the screen control module 162 changes the display screen by turning off the rear display unit 120 and turning on the front display unit 110 in step S43. The screen control module 162 stores the last state of multimedia execution and displays the corresponding multimedia function menu screen in the front display unit 110 in step S44.

The screen control module 162 identifies whether a multimedia function is selected from the menu screen in step S45. If a multimedia function is selected from the menu screen, an execution screen of the selected multimedia function is displayed in the front display unit 110 in step S46.

Subsequently, while executing the multimedia function in the front display unit 110, the screen control module 162 identifies whether the screen change button 151 is pressed. If the screen change button 151 is pressed, the screen control module 162 changes the display screen to the rear display unit 120.

The present invention provides a mobile terminal having a dual display unit, and a method of changing a display screen from a rear display unit supporting a normal mode to a front display unit supporting a multimedia mode, and returning to the rear display unit, when execution of a multimedia function is required in the rear display unit. Such a method of changing a display screen provides an optimum environment in a mobile terminal having additional multimedia functions, and may be applied widely according to the screen state of the rear display unit and the multimedia function to be executed. Therefore, the method of changing a display screen according to the present invention improves user convenience and effectiveness of a mobile terminal having additional multimedia functions.

Although exemplary embodiments of the present invention have been described in detail hereinabove, it should be understood that many variations and modifications of the basic inventive concept herein described, which may appear to those skilled in the art, will still fall within the spirit and scope of the present invention as defined in the appended claims.

What is claimed is:

1. A method of changing a display screen of a mobile terminal operably connected to a first display screen for displaying a user interface corresponding to at least one function supported by a first mode and a second display screen for displaying a user interface corresponding to at least one function supported by a second mode, comprising:
   receiving a user input selecting one function from a plurality of functions;
   identifying which mode the selected function is supported by;
   determining a display screen, from the first display screen and second display screen, on which to display a user interface corresponding to the selected function according to the identification; and
   displaying the user interface corresponding to the selected function on the determined display screen.

2. The method of claim 1, further comprising:
   displaying a display notification notifying a screen change on the display screen displaying at least part of the plurality of functions before displaying the user interface corresponding to the selected function.

3. The method of claim 1, further comprising:
   displaying a menu screen on the determined display screen after displaying the user interface corresponding to the selected function.

4. The method of claim 1, further comprising:
   determining whether a screen change input is received after displaying the user interface corresponding to the selected function on the determined display screen;
   displaying a display notification notifying a screen change on the determined display screen if the screen change input is received; and
   displaying a user interface on the display screen other than the determined display screen when a time duration has elapsed after displaying the display notification notifying the screen change.

* * * * *